(12) United States Patent
Schneider

(10) Patent No.: US 10,168,600 B2
(45) Date of Patent: Jan. 1, 2019

(54) SYSTEM AND METHOD FOR OPTICAL SAMPLING WITHOUT AN OPTICAL SOURCE

(71) Applicant: Thomas Schneider, Michendorf (DE)

(72) Inventor: Thomas Schneider, Michendorf (DE)

( * ) Notice: Subject to any disclaimer, the term of this patent is extended or adjusted under 35 U.S.C. 154(b) by 0 days.

(21) Appl. No.: 15/460,255

(22) Filed: Mar. 16, 2017

(65) Prior Publication Data

US 2018/0267387 A1 Sep. 20, 2018

(51) Int. Cl.
*G02F 1/35* (2006.01)
*G02F 1/365* (2006.01)

(52) U.S. Cl.
CPC ............ *G02F 1/3532* (2013.01); *G02F 1/365* (2013.01); *G02F 2203/56* (2013.01)

(58) Field of Classification Search
CPC ..... G02F 1/3532; G02F 1/365; G02F 2203/56
See application file for complete search history.

(56) References Cited

U.S. PATENT DOCUMENTS 9,190,797 B2 * 11/2015 Schneider ............. H01S 3/0078
9,395,535 B2 * 7/2016 Schneider ............. G02B 26/06

* cited by examiner

*Primary Examiner* — Daniel Petkovsek

(57) ABSTRACT

System and methods for the sampling of an optical signal by generating a plurality of copies of the spectrum of the said optical signal including at least one sampling block for the convolution between the optical input spectrum and an optical comb; wherein the said sampling block includes a modulator, and a bias voltage generator, the said sampling block is driven by an electrical comb generator and a phase shifter, the said electrical comb generator being configured to generate a number of N lines, with N from one to infinity, in the radio frequency domain, equally spaced in frequency and locked in phase, the said modulator being configured to generate a plurality of 2N+1 copies of the input spectrum from (i) the signal spectrum and (ii) a number of N lines provided by the said electrical comb generator.

9 Claims, 11 Drawing Sheets

SYSTEM AND METHOD FOR OPTICAL SAMPLING WITHOUT AN OPTICAL SOURCE

FIELD OF THE INVENTION

The present invention relates to the sampling of optical or electrical signals. Since sampling is the first step to convert an analogue to a digital signal, the method is of special interest for test and measurement equipment, high-speed optical communications and wireless radar applications.

BACKGROUND OF THE INVENTION

During recent years, many efforts to increase the sampling rate and the effective number of bit (ENOB) of analogue-to-digital converters (ADC) have been made. Analogue-to-digital converters are required for the conversion of analogue into digital signals. These analogue signals can be wireless, like radar signals, they can be electrical, or optical signals. The network nodes of the internet for instance, require extensive analogue-to-digital conversion of coherent signals. The most common sampling method is a sampling with electronically sample-and-hold circuits. Since the data rates in the worldwide networks increase every year, these circuits come to their limits, which is expressed in a drastically increase of the energy consumption.

For an ideal sampling the signal-to-sample is multiplied by a Dirac-Delta pulse sequence. As a result, every single pulse of the sequence is weighted with the value of the signal-to-sample at this distinct time. This amplitude value can correspond to a voltage, a current, an electrical or magnetical field or any other measuring value. However, a Dirac-Delta sequence is just a mathematical construct. Due to causality, it cannot be generated in practice.

Electronically sample-and-hold circuits open a gate for a distinct time and take the value from the signal-to-sample during the time of the opening of the gate. Electronically samplers can only process electrical signals (current, voltage). Optical signals have to be transformed to the electrical domain by a photodiode or a balanced photo-detector, for instance. The sampled value will be further processed by the following electronics to form a complete analog-to-digital converter. The opening of the gate can be approximated by a rectangular function. Thus contrary to an ideal sampling, the signal-to-sample is multiplied by a rectangular pulse sequence. This leads to a distortion of the sampled signal, which has to be compensated by energy consuming electronics. The higher the sampling rate, the higher is the energy consumption of electronic analog-to-digital converters. Additionally, the analogue bandwidth of electronic samplers is restricted to a few $10^{th}$ of GHz.

In contrast, optical sampling methods can sample very high analogue bandwidths. In an optical sampler the optical signal-to-sample is multiplied by a pulse sequence, generated by an optical pulse source, typically a mode-locked laser. For the multiplication a nonlinear effect like four wave mixing or cross phase modulation in a nonlinear crystal or a nonlinear fiber can be used. Another possibility is the multiplication between the signal-to-sample and the pulse source in a modulator or a balanced-photodetector, or -receiver. However the nonlinearities in the modulator, the balanced-receiver or the nonlinear element lead to a distortion of the sampled signal. At the same time, mode-locked lasers are quite expensive and they hinder an integration of optical sampling on a chip together with the required electronics in order to build a complete analog-to-digital converter. For the multiplication between the signal-to-sample and the pulse source in a modulator or a balanced receiver, the analogue bandwidth of the signal-to-sample is restricted by the bandwidth of the modulator or balanced receiver.

OBJECTIVE OF THE PRESENT INVENTION

An objective of the present invention is to provide a system for the sampling of high bandwidth signals, which is capable of being integrated on a chip. A further objective of the present invention is to provide a method for the sampling of high bandwidth signals, which is capable of being integrated on a chip.

BRIEF SUMMARY OF THE INVENTION

The present invention relates to a method and system to sample a signal. Sampling refers to a method to periodically take the values of a signal at very short time-slots. The present invention consists of generating a number of copies of the spectrum of the signal-to-sample. Mathematically this can be seen as convolving the optical spectrum of the signal-to-sample with a phase-locked optical frequency comb. The frequency spacing between the comb lines has to be equal and the phase between the different comb lines has to be locked. In the time-domain this convolution is a multiplication between the optical signal-to-sample and the time-domain representation of the optical comb.

The straightforward method to generate copies of a signal-to-sample in the frequency domain consists in using modulating devices. These modulating devices can be one or a number of intensity modulators for instance. If the signal-to-sample is in the optical domain (usually, the C-band of optical telecommunications, around 1550 nm, or 193 THz), no optical source is required. Thus, integration together with the required electronics to build a complete analogue-to-digital converter on a silicon photonics platform is straight forward.

If the signal-to-sample is in the electrical or wireless domain (0-10 THz), a continuous-wave laser source and an additional modulator is required to transform the electrical or wireless signal into the optical domain. The optical signal-to-sample is applied to the optical input of the modulator. At the electrical input an electrical frequency comb is applied. This electrical comb consists of N frequency lines with N from 1 to infinity. The different lines must have equal frequency spacing to each other and have to be phase locked. Depending on the adjustment of the modulator, it generates either 2N or 2N+1 copies of the input spectrum of the signal-to-sample. In the time domain these copies are a sampling signal weighted with the sampling values. The sampling values can be retrieved by an integration of the sampling signal over a time interval of the sampling rate.

The frequency spacing between the comb lines defines the maximum real-time sampling rate. The overall bandwidth of the comb defines the maximum sampling rate for non-real-time sampling, or for a parallelization of the method. All required parameters can be tuned electrically, so that an adaptation of the sampling to the signal-to-sample is simple and fast.

In the FIGS. 3-7 optical connections with an optical fiber or waveguide are shown by solid lines, whereas electrical connections are presented by dashed lines.

Figure 3:
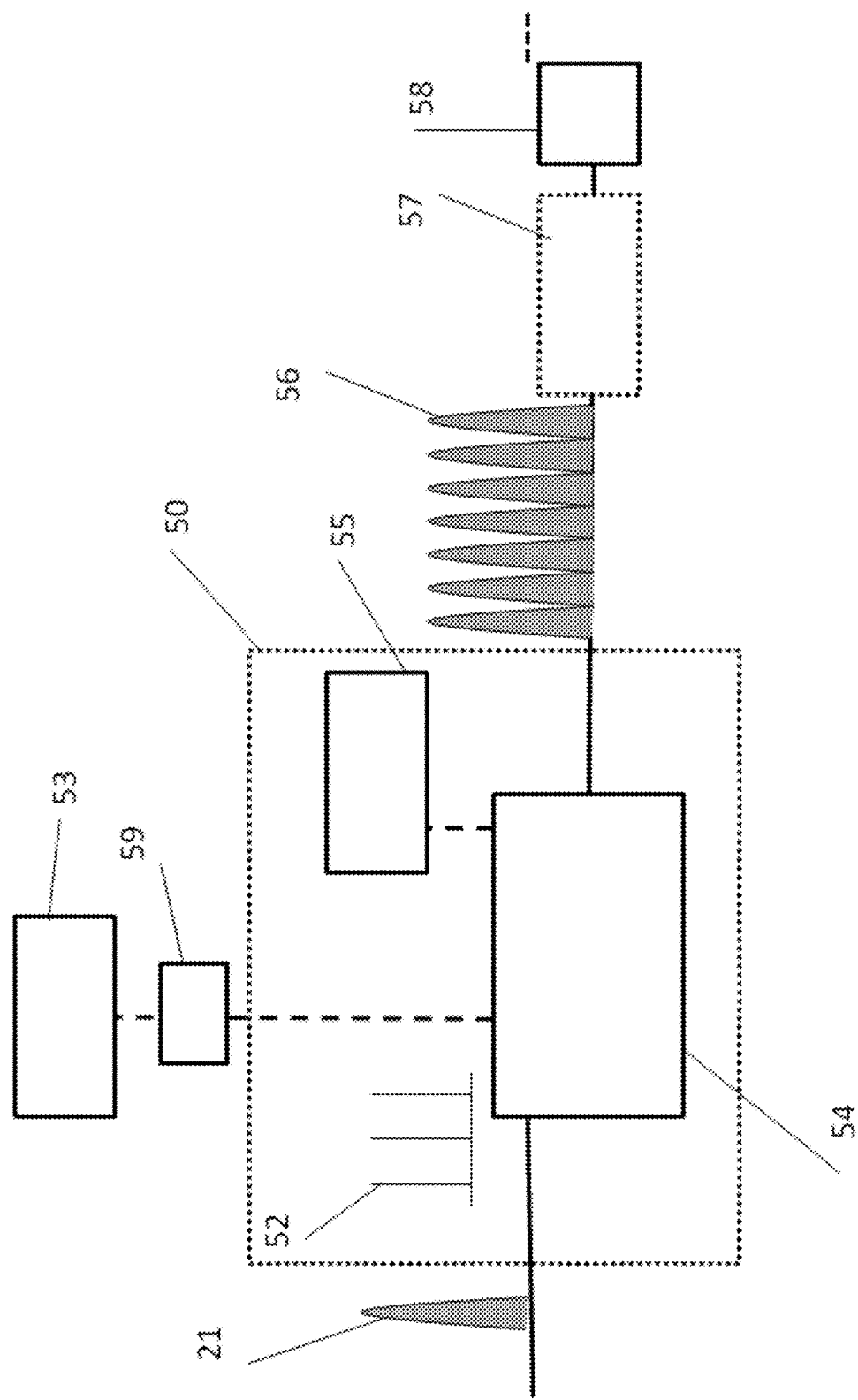

FIG. 3 shows an advantageous embodiment of a system for the sampling according to the present invention. The sampling itself is carried out in the sampling block (50). The sampling block comprises an intensity modulator (54), and a bias control for the modulator (55). The signal (shown in the spectral domain (21)) is applied to the optical input of the modulator (54). At the electrical input a frequency comb (52) in the radio frequency domain (0-$f_m$) is applied. Here $f_m$ corresponds to the maximum electrical bandwidth of the used modulator. This frequency comb is generated by a comb generator (53), which produces a number of N lines. Depending on the adjustment of the bias voltage and the electrical power of the electrical comb, the modulator generates either k=2N or k=2N+1 copies of the input spectrum (56). If the frequencies of the electrical frequency comb are locked, the phases of the generated copies are locked as well. Mathematically this can be seen as the convolution between the signal spectrum (21) and an optical comb with k frequency lines. The sampling signal is transformed to the electrical domain via a photodiode (58). To get the sampling points an integration over the time interval $t_s=1/\Delta f$ is required. This can be achieved with a filter with the bandwidth $\Delta f$ at the output (57). Alternatively, the bandwidth of the photodiode (58) can be used to integrate the sampling signal. The frequency comb generator (53) can be an oscillator producing just one sinusoidal wave. Then just three copies of the input spectrum are generated by the modulator. More copies are generated if a frequency-doubler, -tripler and so on, produce higher harmonics of the fundamental wave. However, it is required that all harmonics and the fundamental are locked to each other in phase.

For real time signals the sampling time is restricted to $t_s=1/\Delta f$. The inverse of this sampling time is the sampling rate, usually given in Samples per second (Sa/s). According to the well known Nyquist theorem, the analog bandwidth of the signal-to-sample in the baseband is at most half of the sampling rate. Thus, with a sampling rate of 10 GSa/s=$10^9$ Sa/s an analogue bandwidth of at most 5 GHz can be sampled. The signal spectrum (21) shown in the FIGS. 1, 2, 3 and 5 is the spectrum in the optical domain, which—due to the modulation—corresponds to at least twice the spectrum in the baseband. With a 40 GHz modulator, driven with just one sinusoidal frequency a maximum sampling rate of 40 GSa/s can be achieved for real time signals. Higher sampling rates for real time signals can be achieved by a parallelization, described with FIG. 5. However, for periodical signals the sampling signal can be shifted through the signal-to-sample by a phase change of the electrical comb, which can be done with an electrical phase shifter (59). For periodical signals the maximum sampling rate corresponds to $S_{max}=k\Delta f$. For one 40 GHz modulator, driven with just one 40 GHz sinusoidal frequency, the maximum sampling rate which can be achieved for periodical signals is 120 GSa/s.

Figure 4:
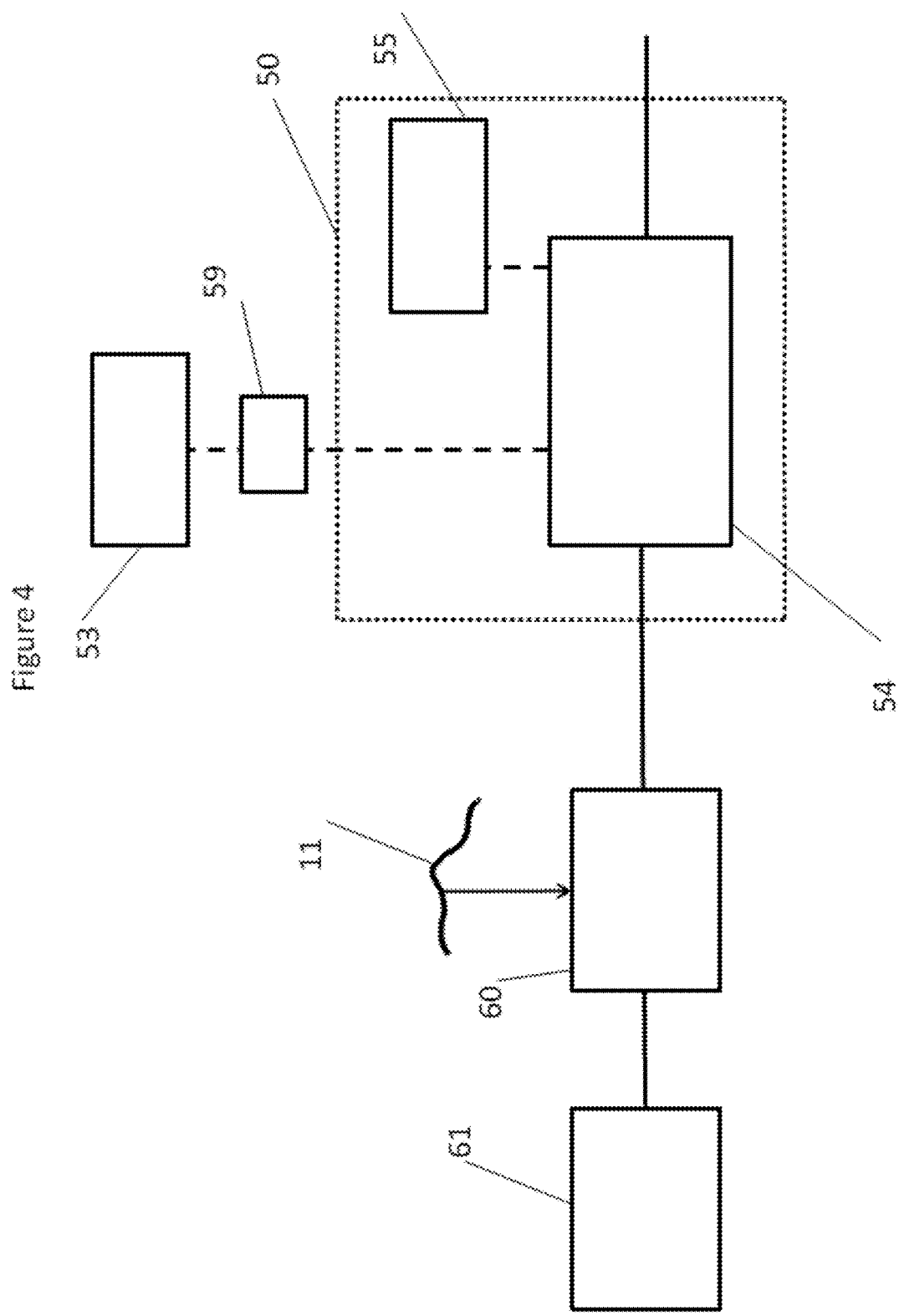

FIG. 4 shows an embodiment of the invention for the sampling of electrical signals. The sampling block (50) consists of the same elements as in FIG. 3 (intensity modulator (54) and bias control device (55)) and the comb is generated by a comb generator (53). The electrical signal-to-sample in the time domain (11) has to be transformed to the optical domain. This is achieved by modulating an optical wave, generated from a continuous wave laser (61) with a modulator (60). The modulator is driven with the electrical signal (11). The modulated optical wave is used as the input to the sampling block (50).

Figure 5:
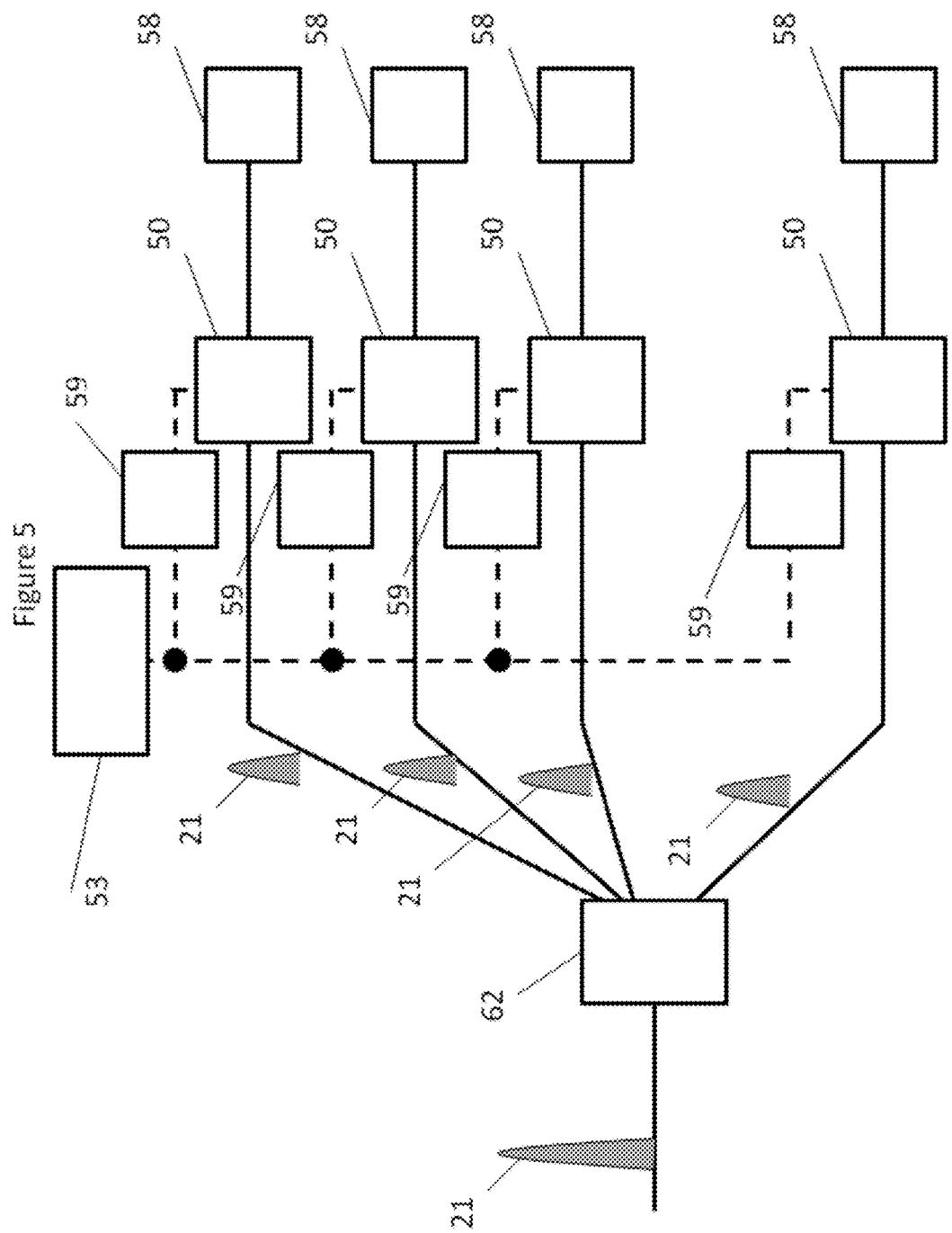

FIG. 5 shows an embodiment for a possible parallelization of the sampling in order to achieve higher sampling rates for real-time signals. The input signal (21) is splitted in a 1:k coupler (62) into k different copies. In each branch the distinct copy is sampled in a sampled block (50) and a photodiode (58) is used to convert the sampling values to the electrical domain, as described above. All sampling blocks are driven by at least one comb generator (53). In each electrical branch a phase shifter (59) leads to an adjustable time shift of the sampling signal in respect to the signal-to-sample. For this parallelization the maximum achievable sampling rate for real-time signals corresponds to $S_{max}=k\Delta f$.

Figure 6:
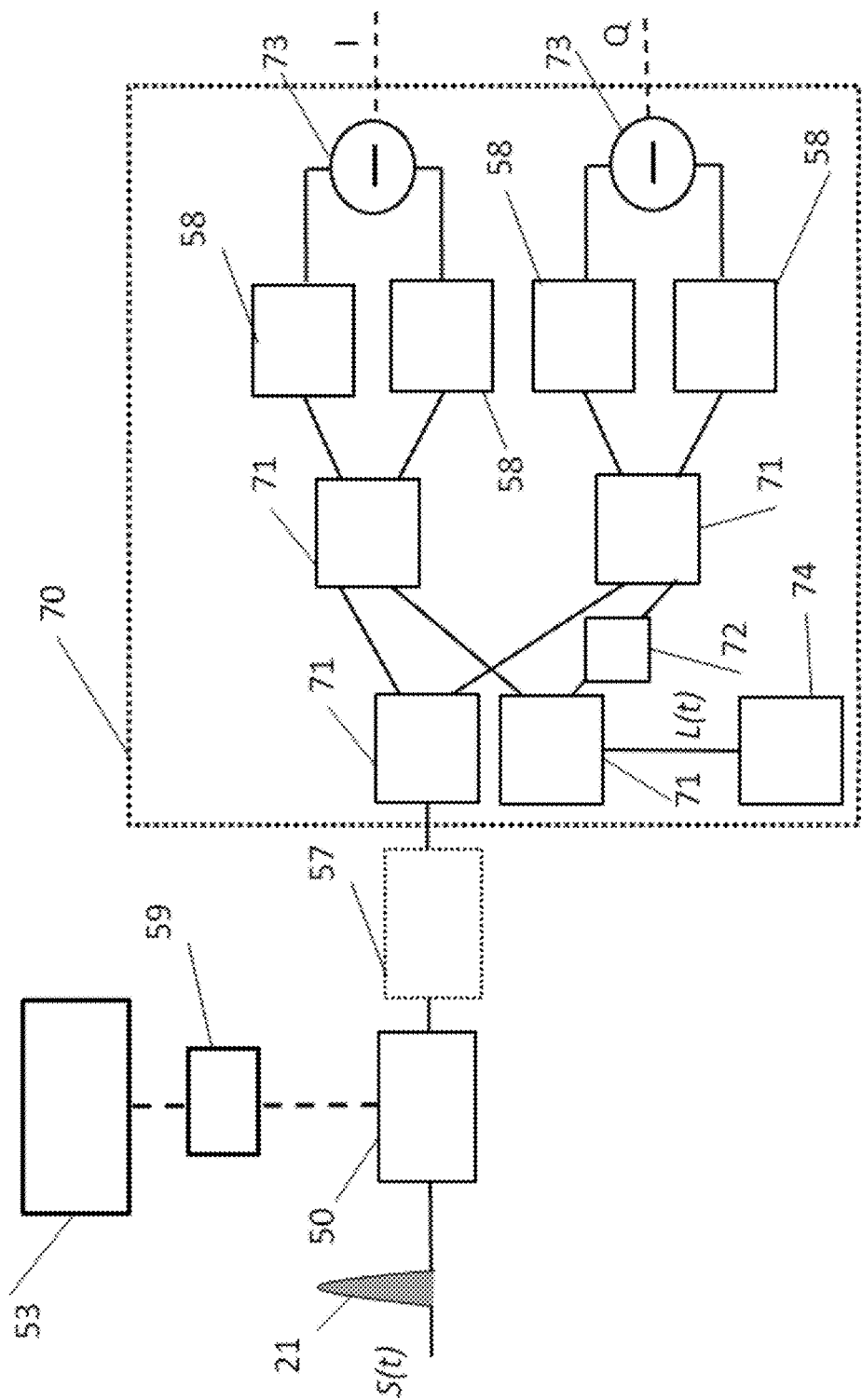

In FIG. 6 an embodiment for a coherent sampling of optical signals modulated with higher order modulation formats in a heterodyne receiver is depicted. Coherent sampling means that both the amplitude and the phase of the signal-to-sample can be detected. The signal-to-sample (21) is applied to the optical input of the sampling block (50), which is driven by a frequency comb, generated by a frequency comb generator (53) and eventually shifted in phase with a phase shifter (59). This sampled signal might be integrated via an optical filter (57). The sampled and eventually filtered optical signal is applied to the signal input of a typical balanced receiver (70). This balanced receiver consists of 3 dB couplers (71), photodiodes (58), an element to subtract the outputs of the photodiodes (73), a 90° phase shifter (72) and an optical local oscillator (74). The signal-to-sample (21) can be written as:

$$S(t)=A(t)e^{j(\omega t+\phi(t))} \quad (1)$$

With A(t) as the time varying amplitude and ($\omega t+\phi(t)$) as the time varying phase of the signal. Here $\omega$ is the angular frequency and $\phi(t)$ is the phase angle used for the encoding of information. If the frequency comb is multiplied with a rectangular function in the frequency domain, the sampling signal in the time domain is a sinus cardinalis pulse sinc(t)= sin(πt)/(πt) convoluted with an unlimited Dirac-Delta sequence $$\Sigma_{n=-\infty}^{\infty} \delta\left(t - \frac{n}{\Delta f}\right)$$

with $\Delta f$ as the frequency spacing between the copies. The sampling block (50) leads to a convolution between the signal-to-sample and the rectangular frequency comb. In the time domain this can be written as:

$$s_a(t) = A(t)e^{j(\omega t + \phi(t))}\left[\operatorname{sinc}(t) * \sum_{n=-\infty}^{\infty} \delta\left(t - \frac{n}{\Delta f}\right)\right] \quad (2)$$

$$= A(t)\left[\operatorname{sinc}(t) * \Sigma_{n=-\infty}^{\infty} \delta\left(t - \frac{n}{\Delta f}\right)\right]e^{j(\omega t + \phi(t))}$$

$$= S_A(t)e^{j(\omega t + \phi(t))}$$

With $$S_A(t) = A(t)\left[\operatorname{sinc}(t) * \Sigma_{n=-\infty}^{\infty} \delta\left(t - \frac{n}{\Delta f}\right)\right]$$

as the sampled amplitude information. According to Equation 2 each sampled amplitude value has still its phase information. This phase information can be retrieved with the following balanced receiver (70). In a heterodyne balanced receiver the phase of the signal is compared with the phase of a local oscillator, generated with a local laser source (74). For higher order modulation formats this is done in an Inphase-(I, or upper branch in FIG. 6) and Quadrature-Phase-(Q, or lower branch in FIG. 6) branch of the device. The output of the local oscillator can be written as: L(t)=$A_l$(t)$e^{j(\omega_l t + \phi_l(t))}$ with $A_l$(t) as the amplitude, $\omega_l$ as the angular frequency and $\phi_l$(t) as the phase angle of the sinusoidal wave generated by the local oscillator. The output at the Inphase or 1 branch of FIG. 6 is, for instance:

$$l(t) \propto 4A(t)A_l(t)\cos((\omega-\omega_l)t+\phi(t)-\phi_l(t)) \quad (3)$$

From this signal both the amplitude and phase information can be retrieved with the usual digital signal processing units used in a coherent receiver. The output at the quadrature phase or Q branch is the sine of Equation 3.

Figure 7:
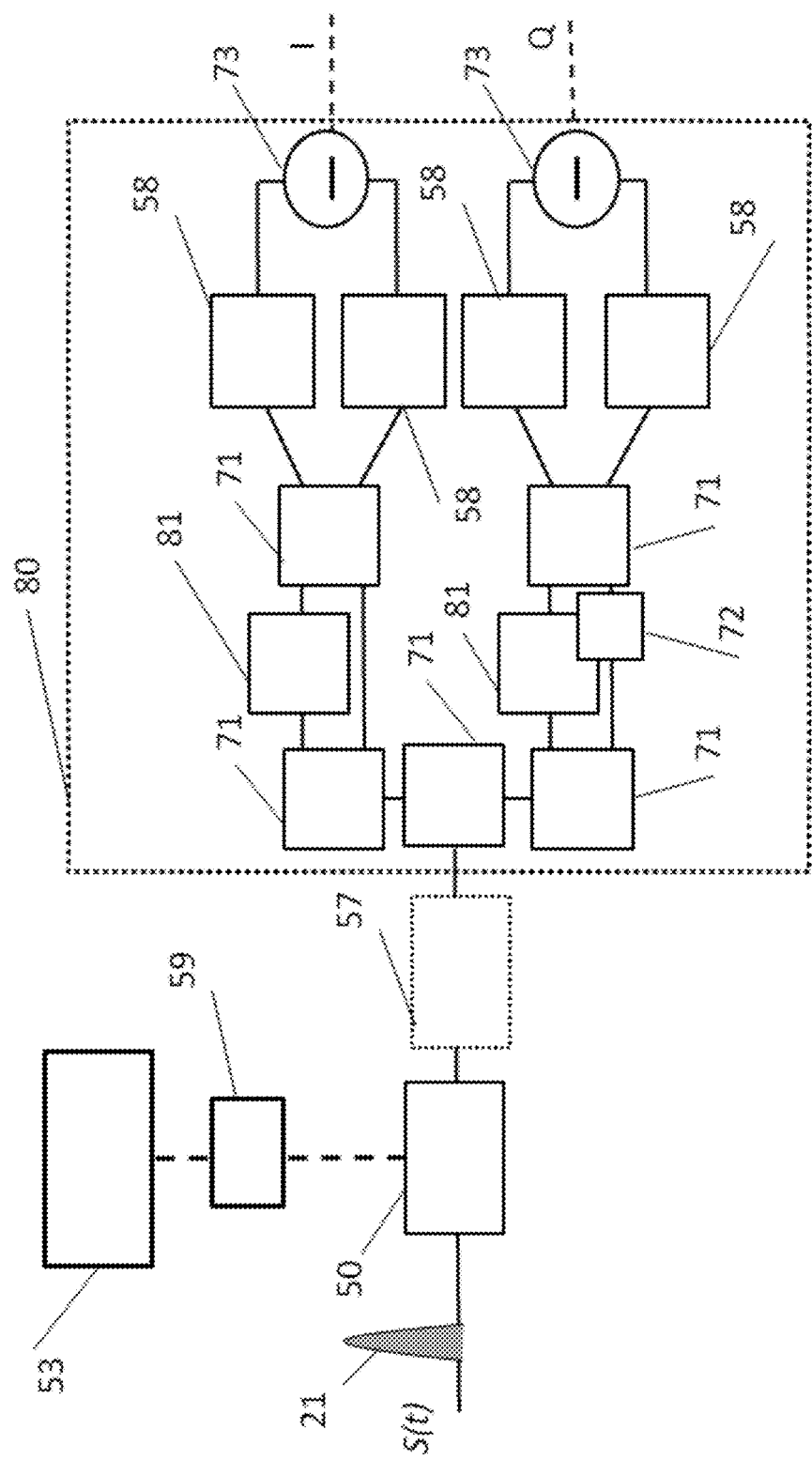

FIG. 7 shows an embodiment for coherent optical sampling with a homodyne receiver. In a homodyne receiver (80) the phase information is retrieved by a comparison of the signal with a time shifted copy of the signal itself. This time shift corresponds to the baud rate, or the symbol length, respectively of the transmitted signals and is usually carried out with a delay line (81) with an optical length which enables a delay by one symbol duration.

Figure 8:
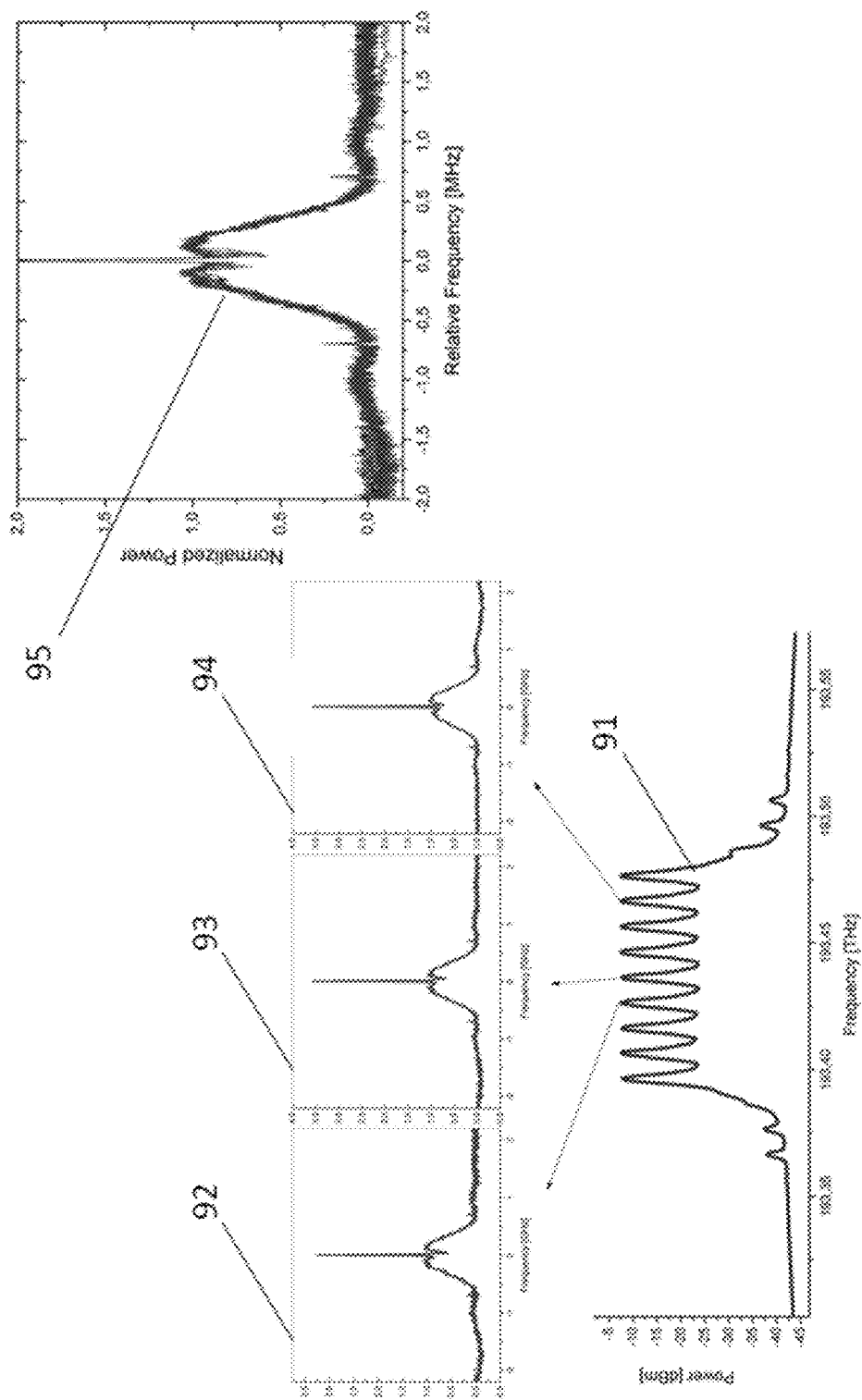

FIG. 8 shows measurement results for the copying of the spectrum of an input signal by a sampling device as described in the present invention. The different copies of the spectrum after the sampling block of a pseudo random bit sequence modulated with a bit rate of a 700 Mbit/s (91) were measured with a conventional optical spectrum analyzer. As can be seen, all copies have the same amplitude. Since the resolution of such a device is too low to show the fine-structure of the spectrum, a home-build high-resolution spectrum analyzer was used to measure the different copies individually. All nine copies are superimposed in (95) and the copies 4, 5 and 8, from left to right, can be seen in (92), (93) and (94). As shown by the figure, all spectral copies are almost equal.

Figure 9:
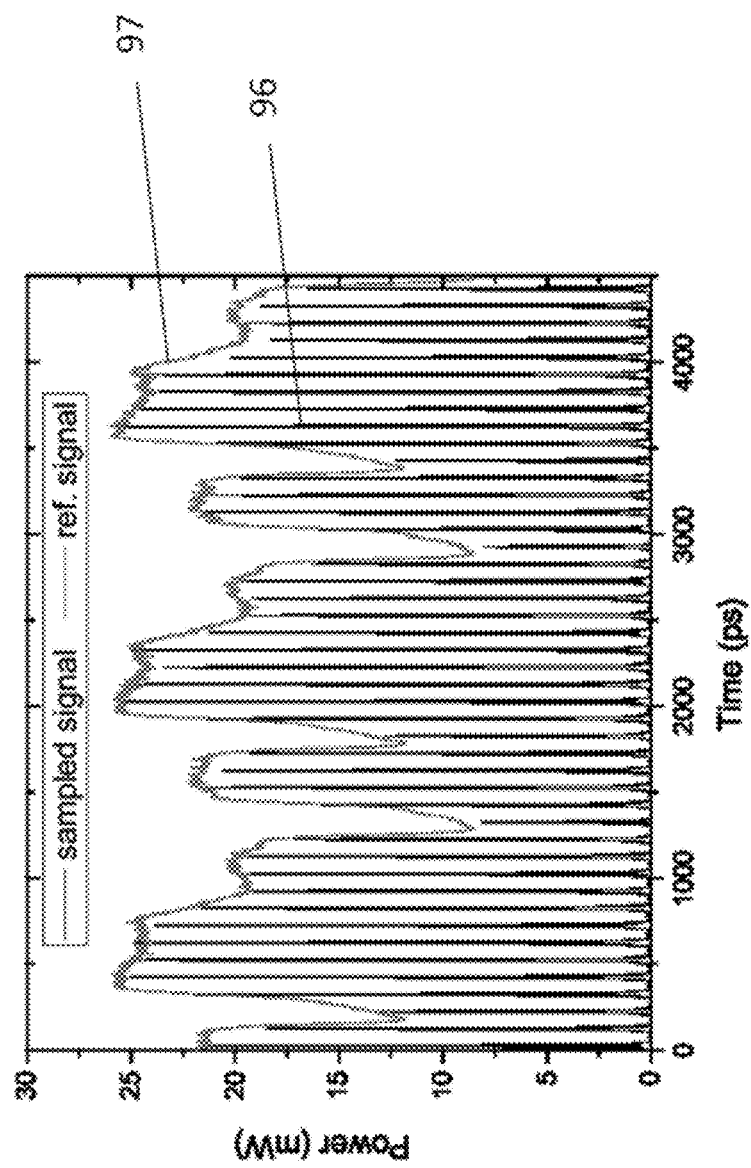

FIG. 9 depicts the sampling of an arbitrary data signal with a sampling device as described by the present invention. The signal-to-sample (97) is a 16-bit data packet created by a pattern generator with a data rate of 10 Gbps. The sampled signal (96) was produced by generating nine spectral copies with a frequency spacing of 10 GHz.

Figure 10:
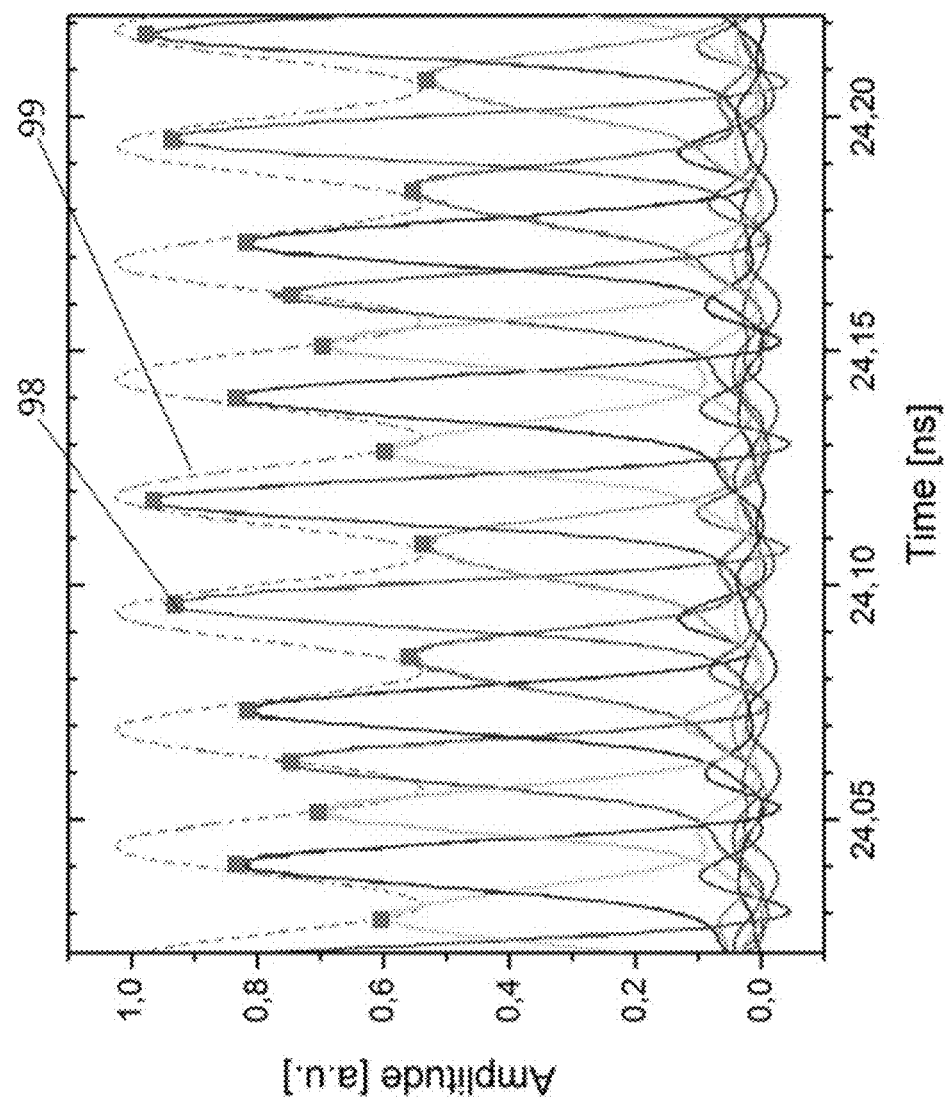

FIG. 10 presents the sampling of a 40 GHz sinusoidal signal (99), again sampled by generating nine equidistant spectral copies with a frequency spacing of 10 GHz. The dots (98) represent the integral over the signal at the output of the sampling block ((50) in FIG. 3) in a time interval corresponding to the sampling time (0.1×10$^{-9}$ s). For the measurement the sampling signal was shifted through the signal-to-sample by a phase change of the electrical comb applied to the intensity modulator.

Figure 11:
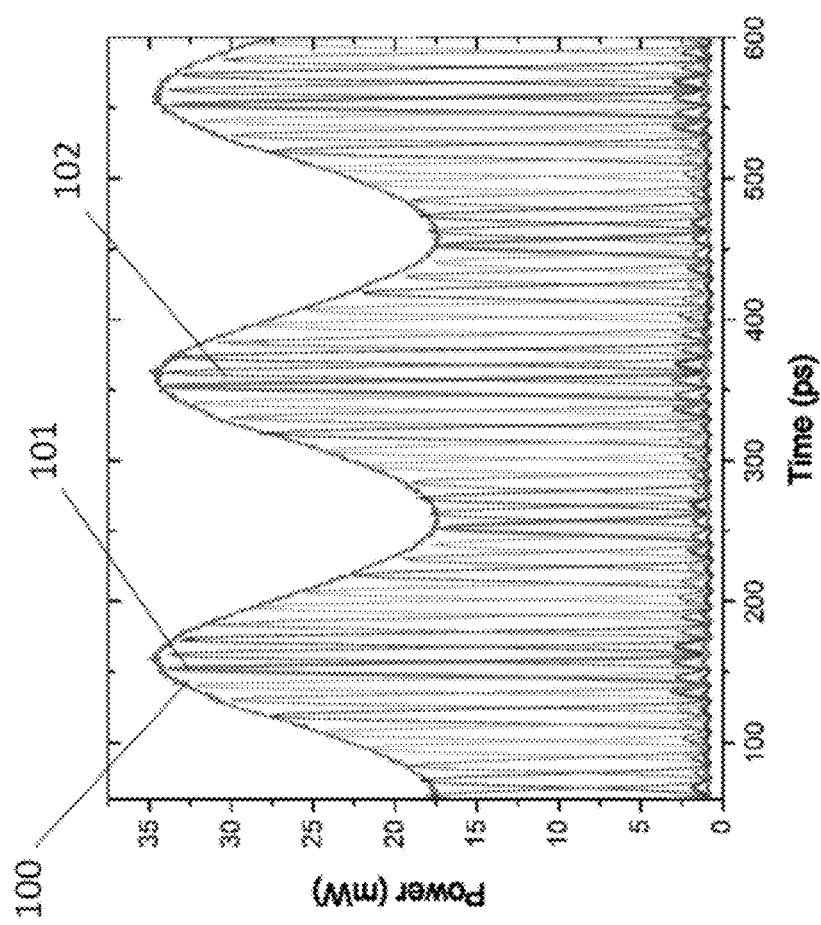

FIG. 11 represents the result of a parallelization, or a time shifting of the sampling signal ((101) and (102)) in respect to the signal-to-sample (100). The time shift between the different sampling signals, for instance (101) and (102) was achieved by a phase change of the electrical signal applied to the intensity modulator.

DETAILED DESCRIPTION OF THE INVENTION

Figure 1:
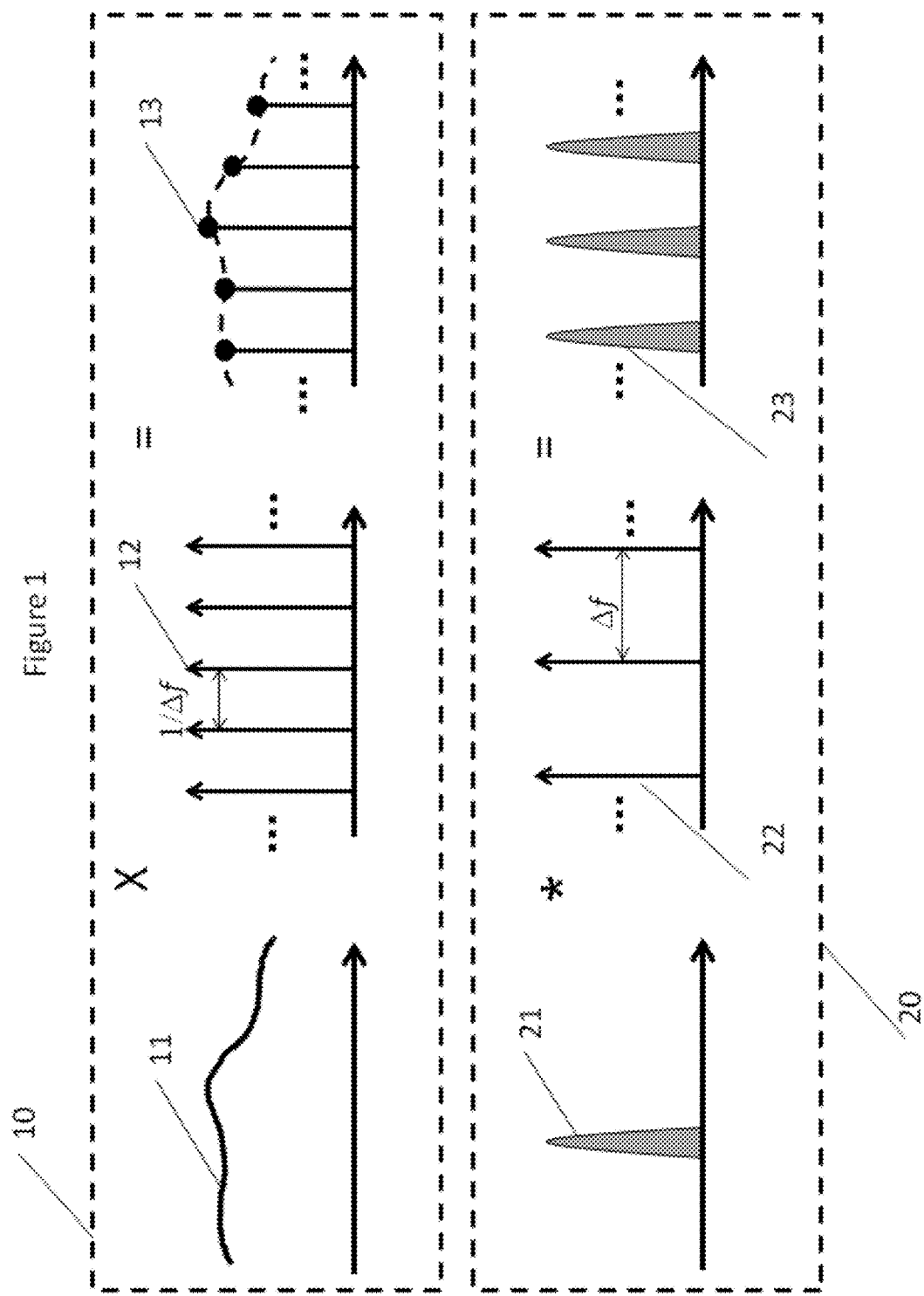
FIG. 1 illustrates the time-frequency duality between a sampling seen in the time domain (10) and a sampling seen in the frequency domain (20) for the ideal case. According to the well known theorems of Fourier analysis, a multiplication (×) in the time domain (10) corresponds to a convolution (*) in the frequency domain (20). Thus the multiplication of the signal (11) with a Dirac-Delta frequency comb (12) in the time domain, leads to a sampling of the signal value at distinct times (13). In the frequency domain (20), the signal spectrum (21) is convolved (*) with an unlimited frequency comb (22). The result is the generation of an unlimited number of copies of the signal spectrum (23), with a frequency spacing of $\Delta f$ between the copies. This frequency spacing is defined by the time distance between the sampling pulses, or the sampling time $t_s=1/\Delta f$. To avoid distortions, this sampling rate should correspond to at least the inverse of twice the bandwidth of the signal in the baseband (at a carrier frequency of zero). However, since a Dirac-Delta sequence is non-causal, such a sampling is impossible in practice.
Figure 2:
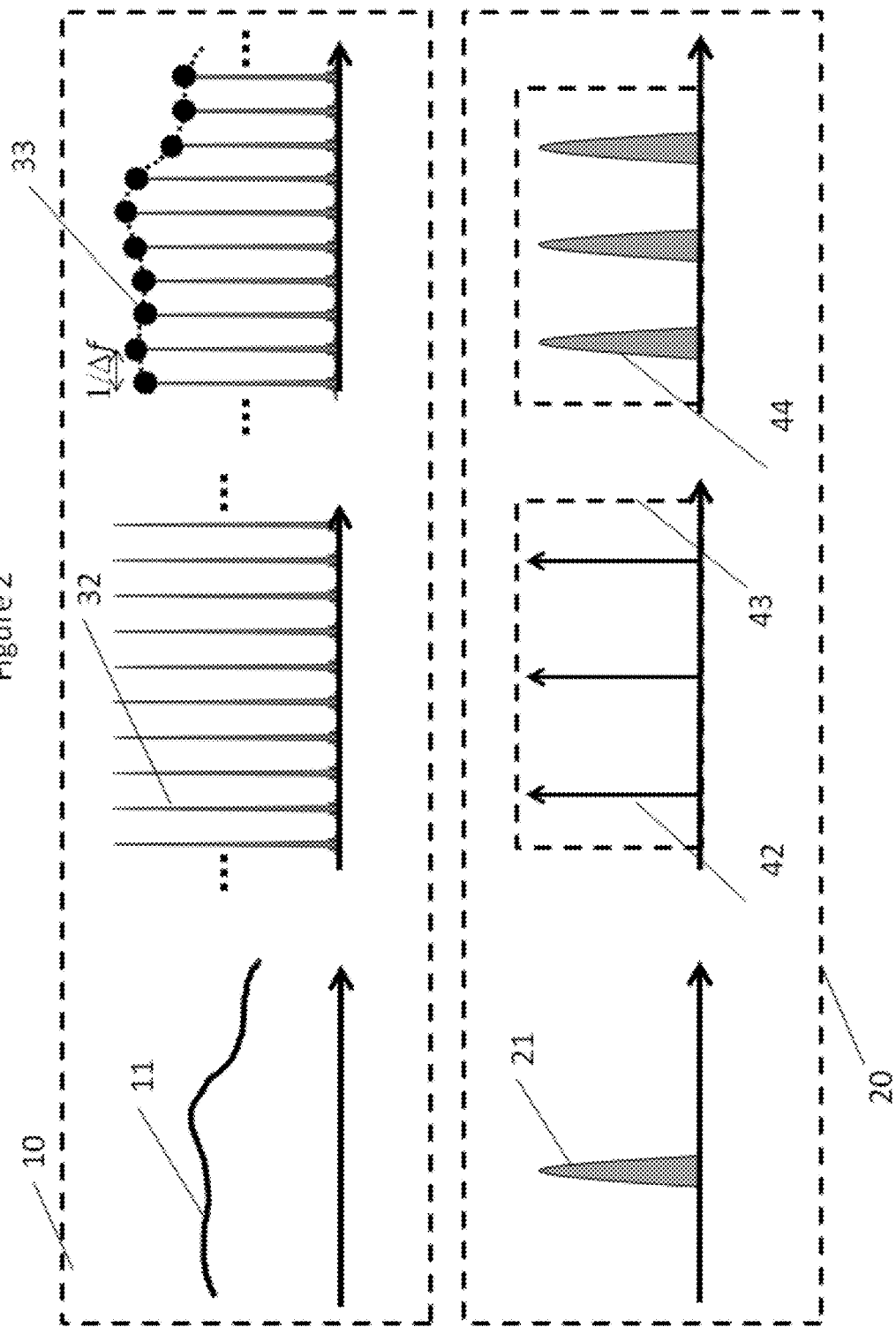
FIG. 2 depicts an embodiment for the sampling according to the present invention. The basic idea of the present invention is to generate a number of equidistant copies of the input spectrum of the signal-to-sample. Thus in the frequency domain (20), the signal spectrum (21) is convolved with a frequency comb (42). In contrast to ideal sampling in FIG. 1, the frequency comb is limited. In this embodiment the comb is limited by a multiplication with a rectangular function (43). However, the frequency comb can be multiplied with any other function which limits the number of comb lines, as well. Therefore, a limited number of copies of the signal spectrum is produced (44). In the time domain (10) this corresponds to a multiplication between the signal (11) and a sinc-pulse sequence (32). As a result, the signal is sampled (33). The sampling points correspond to the integral of the sequence over the sampling time $t_s=1/\Delta f$.

The method and system according to the present invention is based on the time-frequency duality described by Fourier analysis (described by FIGS. 1 and 2). An ideal sampling can be seen as the convolution between a signal spectrum ((21) in FIG. 1) and an unlimited frequency comb ((22) in FIG. 1). The result is an unlimited number of copies of the signal spectrum at the input of the sampling device (FIG. 1 (23)). In the time-domain this corresponds to a multiplication between the signal in the time-domain (FIG. 1 (11)) and a Dirac-Delta sequence (FIG. 1 (12)). The different pulses of the sequence are weighted with the amplitude value of the signal-to-sample (FIG. 1 (13)). According to the well-known Nyquist sampling theorem, to sample and restore a signal with a maximum frequency of $f_{max}$ Hz properly, pulses with a minimum repetition rate of $2f_{max}$ should be utilized. This complies a sampling frequency of $f_s=2f_{max}=1/t_s$, where $t_s$ is the time interval between two sampling points. To achieve high resolution optical sampling, different methods have been proposed. The simplest method for sampling of an optical signal is to utilize a fast photodetector in combination with electrical sample-and-hold circuits. However, the signal is completely sampled in the electrical domain and therefore restricted by the bandwidth of the electronic components. Another approach is based on a multiplication between the signal and a train of short laser pulses. The multiplication can be carried out in a modulator, driven by the electrical signal[1]. For this method the sampling rate is restricted by the bandwidth of the modulator. Faster sampling is achieved by multiplication in a nonlinear element[2,3]. A temporal magnifier such as a time lens can be used for very short optical waveforms[4]. All mentioned techniques require a stable short-period optical pulse source. Conventionally, a mode-locked laser (MLL) is utilized as the pulse source to perform optical sampling, where the sampling rate depends on the repetition rate of the MLL. The main drawback of MLLs is that they are not flexible to be integrated into an electronic system. Additionally, the repetition rate of the pulses, and the sampling frequency depends on the optical path length of the MLLs cavity. Therefore, a tuning of the sampling frequency is rather complicated and only possible in a limited range. Furthermore, for a parallelization of the sampling in time, tunable delay lines for each branch and an exact calibration is required.

In the present invention, a simple all-optical sampling, without requiring any optical pulse source is presented. Thus, an integration together with electronics on a silicon photonics platform is possible. All sampling parameters can be tuned in the electrical domain easily and quickly and a parallelization of sampling in time and frequency domain is straight forward. The basic idea of the present invention is the generation of a limited number of equidistant, phase-locked copies of the input spectrum, this is shown in FIG. 2. Contrary to ideal sampling, the spectrum of the signal-to-sample (FIG. 2 (21)) is convoluted with a limited frequency comb (FIG. 2 (42)). The result is a limited number of copies of the input spectrum (FIG. 2 (44)). Here the comb was limited by a multiplication of an unlimited comb with a rectangular function (FIG. 2 (43)). However, a Gaussian, Lorentzian or another function limiting the number of copies is possible as well. According to the Fourier analysis, the multiplication of the frequency comb with the rectangular function in the frequency-domain leads to a convolution of a sinc-function with a Dirac-Delta sequence (FIG. 2 (32)). Thus, in the time-domain the signal (FIG. 2 (11)) is multiplied with a sinc-pulse sequence (FIG. 2 (32)). Each pulse is weighted with the corresponding value of the signal-to-sample (FIG. 2 (33)). The same can be expressed mathematically by the equation:

$$F^{-1}\{S(f)*[\text{Ш}(f)\times \Pi(f)]\}=s(t)\times(\text{Ш}(t)*\text{sinc}(t)) \quad (4)$$

where $F^{-1}$ is the inverse Fourier transform, $S(f)$ is the spectrum of the time-domain signal $s(t)$ and $*$ depicts the convolution. Here $\text{Ш}(t)$ is the time domain representation of an unlimited frequency comb, $\text{Ш}(f)$, $$\text{Ш}(f)=\Sigma_{n=-\infty}^{\infty}\delta(f-n\Delta f) \quad (5)$$

and the rectangular function $\Pi(f)$ is defined along the bandwidth of the comb in frequency domain $$\Pi(f)=\begin{cases}1 & -\frac{k\Delta f}{2}\leq f-f_c\leq \frac{k\Delta f}{2}\\ 0 & \text{otherwise}\end{cases} \quad (6)$$

$\Delta f$ denotes the frequency spacing between the comb lines, with k the total number of lines, determining $B=k\Delta f$ as the required bandwidth for the rectangle and $f_c$ as the frequency of the optical carrier (usually in the C-band of optical telecommunications, around 193 THz or 1550 nm). This definition leads to an odd number of lines in the comb. For an even number of comb lines, the time domain representation is similar[5]. Suppose an arbitrary signal $S(f)$ in frequency domain with $s(t)$ being the signal in the time domain. The convolution of this signal in the frequency domain with a rectangular frequency comb corresponds to a multiplication between the signal and the Nyquist pulse sequence in time domain[6]:

$$F^{-1}\{S(f)*[\text{Ш}(f)\times\Pi(f)]\}= \quad (7)$$
$$s(t)\times(\text{Ш}(t)*\text{sinc}(t))=s(t)\times\frac{\sin(\pi k\Delta ft)}{k\sin(\pi\Delta ft)}$$

The sampling points are achieved by an integration of the right side of equation (7) over the sampling time.

Proof-of-Concept Experiments

To show the high quality of the present invention, the copying of an input spectrum is shown in FIG. 8. The input spectrum is a pseudo random bit sequence with a bit rate of 700 Mbit/s. The electrical comb applied to the modulator consisted of three lines with a frequency spacing of 1 GHz. The resulting nine optical copies of the spectrum, measured with a conventional optical spectrum analyzer, can be seen in FIG. 8 (91). As can be seen, all copies have the same amplitude. Since the resolution of such a device is too low to show the fine-structure of the spectrum, a home-build high-resolution spectrum analyzer was used to measure the different copies individually. All nine copies are superimposed in (95) and the copies 4, 5 and 8, from left to right, can be seen in (92), (93) and (94). As shown by the figure, all spectral copies are almost equal.

The overall bandwidth of the copies and the frequency spacing between them, thus the sampling, can be changed very fast and precisely by an alteration of the radio frequency comb applied to the modulator. Besides, the sampling point can be shifted regarding the signal by a phase change of the electrical signal. Hence, the sampling can be adapted to the signal and it can be scanned through it electrically. Correspondingly, all-optical sampling of an arbitrary signal is realized through the present invention with fully tunable sampling rate. Consequently, the present invention offers flexible sampling of the signals, without requiring optical pulse sources.

The sampling of an arbitrary 16-bit data packet by the present method is shown in FIG. 9 to prove the performance of the present invention. A pattern generator was used to create the intended data packet with a repetition rate of 100 ps. The curve (97) shows the desired signal, while (96) corresponds to the sampled signal with a rate of 100 ps. The slight differences between the reference and the sampled signal are attributed to deficiencies of the proof-of-concept setup.

The point of sampling can be varied by changing the phase of the RF frequency comb used to drive the sampling block. Likewise, for periodical signals a simple and fast scanning through the signal is possible by an electrical phase change. For non-periodical signals higher sampling rates can be achieved by a parallelization as will be discussed later. The measurement of a 40 GHz sinusoidal signal can be seen in FIG. 10, where the original waveform is represented by (99). Here a first integration of the sampling signal was carried out by a photodiode. Within each trace of the measurement two consecutive sampling signals are shown and analyzed. During the measurement the phase of the electrical comb was shifted, leading to a delay in steps of 11.1 ps. Finally, the signal traces were recorded and additionally integrated by software within a time window of 100 ps. The result is illustrated by the dots (98) representing the sampling points. The sampling of a 5 GHz sinusoidal waveform can be seen in FIG. 11. To visualize the tuning of the sinc-pulse train the sampling points were time-shifted by an electrical phase shift of the electrical comb. For every trace a delay of 11 ps is added equal to the pulsewidth of the sampling signal. Different measurements were carried out and plotted together in FIG. 11 (101) and (102).

Periodical signals can be sampled by a time shift of the sampling signal through the signal-to-sample. This can be achieved by a phase shift of the electrical frequency comb. Thus, the sampling rate is defined by the pulse width of the sampling signal. For one sampling block, the maximum achievable sampling rate for periodical signals is restricted to three times the bandwidth of the intensity modulator. For two sampling blocks it corresponds to four times the bandwidth of the intensity modulator with the highest bandwidth. For high-bandwidth non-periodic signals, or for so called real-time sampling, a parallelization of the method is required. This parallelization can be achieved in time or in frequency domain. A possibility for a time-domain parallelization is shown in FIG. 5. The optical input spectrum (21) is coupled through a 1:k coupler (62) into k parallel branches. In each branch the signal should be sampled at a fixed time delay compared to the previous one. This time delay can simply be achieved by a phase change (59) between the comb feeding the sampling blocks (50) in the branches. Thus, no optical tunable delays are required. Since all sampling parameters are adjusted in the electrical domain, a fast and simple adaptation to the signal-to-sample is possible. Due to parallelization, the method grants k-times larger bandwidth with slow electronic components and photodiodes for non-periodic signals.

Since no pulse source and no optical nonlinearity of the method is required, an integration on a silicon photonics platform for instance, together with electronics to form a complete analogue-to-digital converter, seems to be straight forward. An integration could enable small-footprint, low-cost optical sampling devices.

Methods

To convert a continuous signal to a digital one in time domain, a sampling of the time domain waveform is required. The analogue signal to sample s(t) is supposed to be a band limited function with a baseband bandwidth of $B_s$ and the signal can be recovered, if the sampling rate (number of samples per second) is at least twice the maximum frequency present in the signal spectrum $f_s=1/t_s>2B_s$. Here $t_s$ is the time duration between two samples, or the inverse of the sampling rate. The mathematical description of sampling can be found in almost every textbook of signal theory. The sampled discrete signal in time domain is:

$$s_s(t) = s(t) \sum_{n=-\infty}^{\infty} \delta\left(t - \frac{n}{\Delta f}\right) = \sum_{n=-\infty}^{\infty} s\left(\frac{n}{\Delta f}\right) \delta\left(t - \frac{n}{\Delta f}\right) \quad (8)$$

where $\delta(t)$ is an ideal Dirac-delta function. In the frequency domain this corresponds to a convolution (*) between the frequency domain representations of the signal S(f) and the Dirac delta function:

$$S_s(f) = S(f) * \sum_{n=-\infty}^{\infty} \delta(f - n\Delta f) = \sum_{n=-\infty}^{\infty} S(f - n\Delta f) \quad (9)$$

The result is an unlimited number of copies of the signal spectrum with a frequency distance of $\Delta f$. This sampled signal can be reconstructed by a multiplication by a rectangular function in the frequency domain. This multiplication only filters one of the unlimited copies of the spectra.

$$S(f) = \sum_{n=-\infty}^{\infty} S(f - n\Delta f) \cdot rect\left(\frac{f}{\Delta f}\right) \quad (10)$$

The result is the analogue signal:

$$s(t) = \left[\sum_{n=-\infty}^{\infty} s\left(\frac{n}{\Delta f}\right)\delta\left(t - \frac{n}{\Delta f}\right)\right] * sinc(\Delta f t) = \quad (11)$$

$$\sum_{n=-\infty}^{\infty} s\left(\frac{n}{\Delta f}\right) sinc\left(\Delta f\left[t - \frac{n}{\Delta f}\right]\right)$$

with sinc as the sinus cardinals or sinc-function, defined as:

$$sinc(t) = \frac{\sin(\pi t)}{\pi t} \quad (12)$$

Thus, a band limited analogue signal can be seen as a superposition of an unlimited number of sinc-pulses weighted with the sampling value and time shifted by the sampling time. The sampling with the present invention leads to:

$$S_s(f) = S(f) * \left[\sum_{n=-\infty}^{\infty} \delta(f - n\Delta f) \cdot rect\left(\frac{f - f_c}{B}\right)\right] \quad (13)$$

in the frequency domain, with $f_c$ as the carrier frequency of the optical wave and B as the bandwidth of the signal-to-sample. So, the copies of the spectrum are not unlimited as for the sampling with a Dirac-Delta function, but restricted by the number of lines in the optical comb k. In order to avoid distortions, each copy of the spectrum can at the most be as broad as the frequency spacing between the comb lines in the frequency domain. For this reason, this restricts the sampling rate to $f_s=\Delta f$ for the sampling of a non-periodical signal. The time spacing between the sampling points is equal to the repetition rate of the sampling signal. Whereas for a periodical signal, the sampling signal can be shifted in time domain to any point. For parallelized sampling, in each branch the sampling points are taken with the repetition rate of the sequence. For the sampled signal in time domain it follows for the present invention:

$$s_s(t) = s(t)\left[\sum_{n=-\infty}^{\infty} \delta\left(t - \frac{n}{\Delta f}\right) * sinc(Bt)\right] \quad (14)$$

$$= s(t)\sum_{n=-\infty}^{\infty} sinc\left(B\left[t - \frac{n}{\Delta f}\right]\right)$$

$$\approx \sum_{n=-\infty}^{\infty} s\left(\frac{n}{\Delta f}\right) sinc\left(B\left[t - \frac{n}{\Delta f}\right]\right)$$

Comparing this result with the right side of Equation (11) shows, that the sampling with the present invention gives almost the same results as an ideal-sampling with a Dirac-Delta sequence.

| LIST OF REFERENCE NUMERALS | |
| --- | --- |
| 10 | time-domain |
| 11 | signal-to-sample in time-domain |
| 12 | Dirac-Delta pulse sequence |
| 13 | sampled signal in time-domain |
| 20 | frequency-domain |
| 21 | signal-to-sample in frequency-domain |
| 22 | unlimited frequency comb |
| 23 | sampled signal in frequency-domain |
| 32 | sinc-pulse sequence |
| 33 | sinc-pulse Sampled signal in time-domain |
| 42 | limited frequency comb |
| 43 | rectangular function |
| 44 | limited copies in frequency-domain |
| 50 | sampling block |
| 52 | electrical frequency comb |
| 53 | electrical comb generator |
| 54 | optical modulator |
| 55 | bias voltage control |
| 56 | input spectrum convolved with optical comb |
| 57 | optical filter |

-continued

LIST OF REFERENCE NUMERALS

| | |
|---|---|
| 58 | photodiode |
| 59 | electrical phase shifter |
| 60 | optical modulator |
| 61 | laser source |
| 62 | 1:k coupler |
| 70 | heterodyne receiver |
| 71 | 3-dB coupler |
| 72 | 90° phase shifter |
| 73 | subtracting element |
| 74 | local oscillator |
| 80 | homodyne receiver |
| 81 | time delay |
| 91 | sampled PRBS signal in frequency domain |
| 92 | fourth copy |
| 93 | fifth copy |
| 94 | eighth copy |
| 95 | all nine copies superimposed |
| 96 | measured sampling signal |
| 97 | measured signal-to-sample |
| 98 | sampling point |
| 99 | 40 GHz Signal-to-sample |
| 100 | 5 GHz Signal-to-sample |
| 101 | sampling signal |
| 102 | time shifted sampling signal |

REFERENCES

[1] Valley, G. C., Li, L. & Yang, Z. Photonic analog-to-digital converters. Opt. Express 15, 1955-1982 (2007).

[2] Westlund, M., Andrekson, P. A., Sunnerud, H., Hansryd, J. & Li, J. High-performance optical-fiber-nonlinearity-based optical waveform monitoring. J. Lightw. Technol. 23, 2012-2022 (2005).

[3] Li, J. et al. 0.5-Tb/s eye-diagram measurement by optical sampling using XPM-induced wavelength shifting in highly nonlinear fiber. IEEE Photon. Technol. Lett. 16, 566-568 (2004).

[4] Salem, R. et al. High-speed optical sampling using a silicon-chip temporal magnifier. Opt. Express 17, 4324-4329 (2009).

[5] Soto, M. A. et al. Optical sinc-shaped Nyquist pulses of exceptional quality. Nat. Commun. 4, 2898, 10.1038/ncomms3898 (2013).

[6] Soto, M. A. et al. Optical sinc-shaped Nyquist pulses with very low roll-off generated from a rectangular frequency comb. Asia Communications and Photonics Conference (2013).

The invention claimed is:

1. A system for the sampling of an optical input signal by generating a plurality of copies of the spectrum of the said optical input signal including:

at least one sampling block for the convolution between the optical input spectrum and an optical comb; wherein the said sampling block includes a modulator, and a bias voltage generator, the said sampling block is driven by an electrical comb generator and a phase shifter, the said electrical comb generator being configured to generate a number of N lines, with N from one to infinity, in the radio frequency domain, equally spaced in frequency and locked in phase, the said phase shifter being configured to shift the phase of the electrical comb lines in respect to the phase of the signal-to-sample, the said modulator being configured to generate a plurality of 2N+1 copies of the input spectrum from (i) the signal spectrum and (ii) a number of N lines provided by the said electrical comb generator, the modulator being further configured to ensure a fixed phase relationship between the plurality of copies using an input bias voltage from the bias voltage generator and a voltage amplitude of the frequency comb.

2. The system according to claim 1, which includes at least two interconnected sampling blocks.

3. The system according to claim 1, wherein the said at least one sampling block is configured to generate a plurality of 2N copies of the input spectrum, with N from one to infinity.

4. The system according to claim 1, wherein the output of the said at least one sampling block is integrated over a distinct time by an optical filter.

5. The system according to claim 1, wherein at its input an electrical or wireless signal-to-sample is converted into an optical signal by a modulation of an optical continuous wave.

6. The system according to claim 1, wherein the signal-to-sample is divided into a number of k branches by a 1:k coupler, with k from 2 to infinity, at least one comb generator provides the electrical comb lines, the time shift in each branch can be individually adjusted by an electrical phase shifter, the time-shifted signal is sampled in each branch with a system according to claim 1.

7. The system according to claim 1, wherein the sampling block is followed by a coherent, heterodyne or balanced receiver or detector.

8. The system according to claim 1, wherein the sampling block is followed by a homodyne receiver or detector.

9. An integrated optical chip, measurement device, spectroscope, communications system, communications network, or photonic analogue-to-digital converter which comprises at least one of the systems according to claim 1.

* * * * *